(12) United States Patent
Roling

(10) Patent No.: US 9,446,856 B1
(45) Date of Patent: Sep. 20, 2016

(54) METHOD AND APPARATUS FOR MAINTAINING AIRCRAFT

(71) Applicant: Rockwell Collins, Inc., Cedar Rapids, IA (US)

(72) Inventor: John E. Roling, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 318 days.

(21) Appl. No.: 13/955,745

(22) Filed: Jul. 31, 2013

(51) Int. Cl.
*G09G 5/00* (2006.01)
*G06F 3/02* (2006.01)
*H04N 7/18* (2006.01)
*B64D 47/00* (2006.01)

(52) U.S. Cl.
CPC ..................................... *B64D 47/00* (2013.01)

(58) Field of Classification Search
CPC ....................................................... G08B 21/00
USPC ......................................................... 340/945
See application file for complete search history.

(56) References Cited

U.S. PATENT DOCUMENTS

| | | | | |
|---|---|---|---|---|
| 5,781,913 | A  * | 7/1998 | Felsenstein | G06F 1/163 345/169 |
| 8,558,872 | B1 * | 10/2013 | Cho | H04N 13/00 348/43 |
| 9,255,909 | B2 * | 2/2016 | Kollgaard | G01N 27/90 |
| 2011/0181497 | A1 * | 7/2011 | Raviv | A63F 13/26 345/8 |
| 2012/0183137 | A1 * | 7/2012 | Laughlin | H04N 7/185 380/200 |
| 2014/0022281 | A1 * | 1/2014 | Georgeson | B64F 5/0045 345/633 |
| 2014/0354529 | A1 * | 12/2014 | Laughlin | G06F 3/011 345/156 |

* cited by examiner

*Primary Examiner* — Fekadeselassie Girma
*Assistant Examiner* — John Mortell
(74) *Attorney, Agent, or Firm* — Angel N. Gerdzhikov; Donna P. Suchy; Daniel M. Barbieri

(57) ABSTRACT

A system for improving the maintenance of aircraft where a head-worn computer with a head up display and communication and control capabilities similar to Google Glass, except for increased ability to access RFID tags, is used to aid an avionics technician by providing visually and aurally information for the technician to perform services in less time with increased quality of service.

16 Claims, 2 Drawing Sheets

METHOD AND APPARATUS FOR MAINTAINING AIRCRAFT

BACKGROUND OF THE INVENTION

This invention relates to field maintenance operations for commercial aviation and military aviation and ground based equipment.

In recent years, field maintenance personnel are being asked to do more in less time. They are asked to be able to service many different aircraft types or different configurations of a single aircraft type. Often, seemingly very similar aircraft have maintenance details which differ quite significantly. The documentation needed to support the maintenance of a single aircraft is extensive and constantly changing. While it may be desirable to have all aircraft which had the same configurations at the time of first flight to be updated in lock step so that they remain nearly identical, this is not always possible or economically feasible. Field maintenance personnel do not necessarily know all the details of a particular aircraft's configuration until they are able to examine the systems and configurations in person.

Aviation maintenance is used herein as an example of one environment where the present invention provides much utility. However, it should be understood that the present invention is similarly beneficial in military land equipment (tanks, trucks, etc.) repair and maintenance, large construction equipment, off-shore oil rigs, manned space environments, just to name a few.

Typically, maintenance personnel need to first examine each avionics box to determine its precise configuration of hardware and software. After the equipment is fully identified, and its configuration and status is known, then the field maintenance personnel are able to gather all the documentation which is needed to move forward. This may mean going to the field maintenance library and assembling a large collection of paper documents and manuals, etc., which are wheeled out to the aircraft or electronically gathered and moved to the aircraft with one or more display devices. However, it has been known to have electronic maintenance data stored on the aircraft and made available to maintenance technicians. It also has been known in the industry to utilize cell phones with an additional RFID reader to interrogate and/or read RFID tags and provide information via the cell phone display device.

While these methods are well known in the art, they have the following drawbacks. 1) The increased trips back to get information increases the overall time needed to make almost any repair or maintenance operation. In some cases, the delay in just a few moments can cost lives. 2) The manual correlation of equipment configuration to maintenance documentation can introduce human error with wrong data used for calibrations etc. 3) The complexity of avionics systems is such that assistance may be desired of personnel not available at the maintenance location. Such remote assistance may improve efficiency by eliminating unnecessary equipment removals or repair actions after removal.

Consequently, there exists a need for improvement in field maintenance operation and information management which provides for context-specific access to documentation and to expert assistance for problem resolution.

SUMMARY OF THE INVENTION

It is an object of the present invention to improve the speed and/or quality of repair and maintenance operations for military and aviation equipment.

It is a feature of the present invention to utilize body-worn display, computing and communication equipment, such as Google Glass or an alternate platform, in conjunction with proximity determination and notification equipment.

It is another feature of the present invention to provide a digital library and remote expert assistance and supervisory capability tailored to cooperate with the body-worn equipment of the present invention.

It is advantage of the present invention to link aviation equipment maintenance documentation with the body-worn equipment and permit real time delivery of just the information that is needed.

The present invention includes the above-described features and achieves the aforementioned objects and advantages.

Accordingly, the present invention comprises:

An aircraft maintenance system for aiding avionics technicians in repair to aviation equipment, the system comprising:
 a head-worn computing device comprising:
 a processor, for performing computing functions,
 a head up display, for displaying information to a person wearing said head-worn computing device;
 one of a voice activated controller or a touch pad, configured for receiving commands from the person;
 a communication link, configured for enabling communication between the head-worn computing device and distant electronic equipment;
 wherein said computing functions comprise one of:
 receiving data from an RFID tag;
 using image recognition software to identify a piece of equipment to be serviced;
 using geo-location data to determine equipment in proximity to said head-worn computing device; and
 a digital maintenance data library configured to communicate with said communication link and provide context-specific documentation of equipment to be serviced, where an identity characteristic of said equipment to be serviced is determined electronically.

BRIEF DESCRIPTION OF THE DRAWINGS

In the following description of the drawings, in which like reference numerals are employed to indicate like parts in the various views.

DETAILED DESCRIPTION OF THE DRAWINGS

Figure 1:
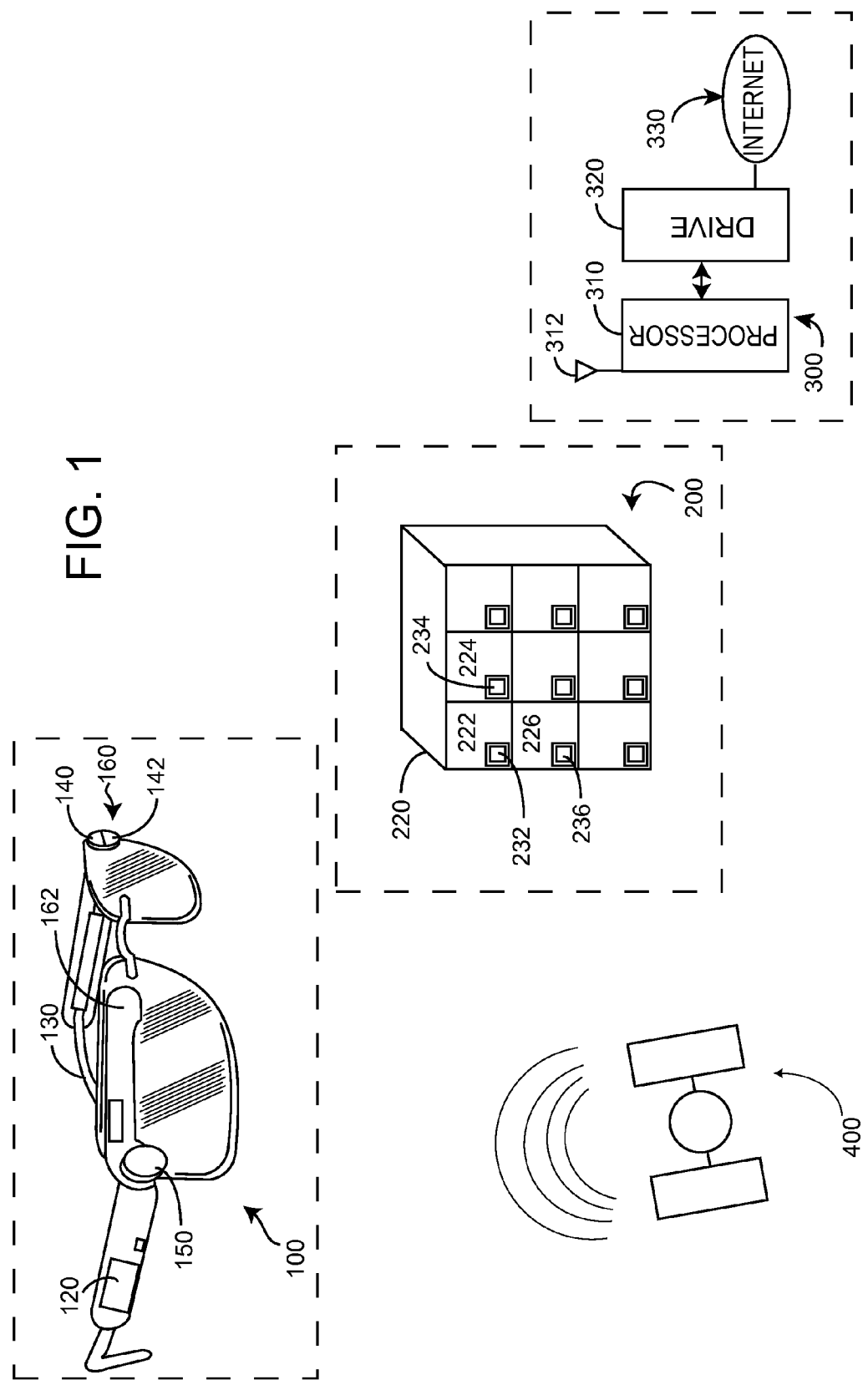
FIG. 1 is a simplified view of a maintenance system of the present invention in a representative maintenance environment.
Figure 2:
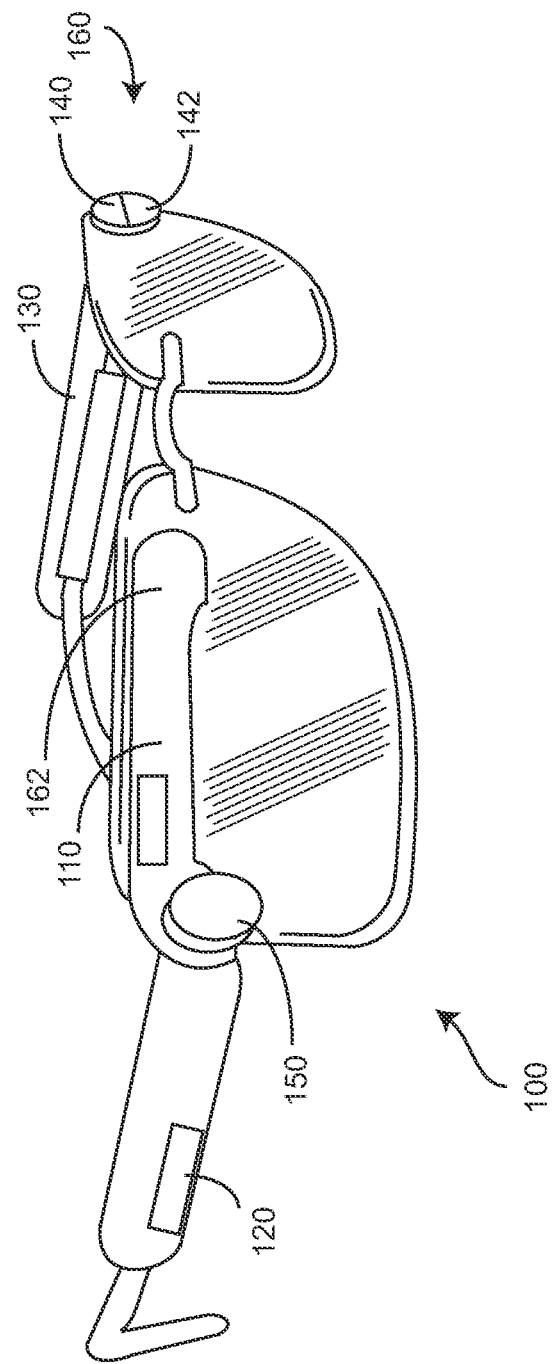
FIG. 2 is a simplified schematic diagram of the body-worn component of the present invention, together with equipment with which it communicates.

Referring now to the drawings, where like numerals refer to like matter throughout, attention is first directed to a system of the present invention as shown in the illustration of FIG. 1. FIG. 1 shows four major subsections, the body-worn components 100, the aircraft equipment to be maintained 200, the service center maintenance digital library 300 and satellite communication and positioning component 400.

More particularly, body-worn system 100 is constructed on a platform similar to a pair of eye glasses and may contain, as a baseline, a system similar to what is known in the industry as Google Glass. Additional capabilities can be added to the Google Glass system, such as RFID transceivers at sensor array 150 for interrogating and receiving responses from RFID tags. Sensor array 150 may include other detectors, such as infrared detectors etc. The system 100 can include a touch pad 120, buttons, cursor controller or similar devices integrated in a temple of the eye glasses platform. A battery and processor may be included into a bridge 110 or a temple 130. Camera 140 other optical sensors 142 and head up display 162 can be utilized for capturing and displaying visual images, respectively. The system 100 preferably includes a cellular phone and mobile data connection over a wireless mobile network.

In operation, the system could work as follows, a maintenance worker would wear the body-worn system 100; the maintenance worker could be an avionics technician, an aircraft mechanic or any other worker such as maintenance people that work on tanks, trucks and other military and sophisticated civilian systems. The worker would approach the aircraft and would have the ability to interrogate particular equipment on the aircraft. In some aircraft, there may be a rack 220 of aviation electronics line replaceable units (LRUs) 222, 224 and 226. These LRUs may perform vastly different functions and may have vastly different maintenance requirements and schedules. Often, these LRUs are removable and swappable with spare LRUs to facilitate quick repairs and minimize interruption in use of the aircraft. Each of the LRUs 222, 224 and 226 are shown with a data tag 232, 234 and 236 respectively attached thereto. These data tags may be merely barcode stickers or other optically readable coded tags, or electronic tags such as, but not limited to, RFID tags, which can be the active type (which emit signals on their own power) or the passive type (which respond when interrogated by an electronic signal). Other data tags, or even no add on tags at all, could be used so long as the LRU 222 has a distinct enough visual appearance and is able to be detected and identified visually by image recognition software. Body-worn system 100 includes an electronic receiver transmitter/sensor array 150, which could include sensors for detecting reflected RF energy, transmitted RF energy; it can include system for interrogating/illuminating data tags with certain types of electromagnetic radiation. Body-worn system 100 may include a camera and optical sensor system 160, which may or may not be combined or integral with array 150. These data tags may contain merely an identification of the LRU and nothing else. With this identification, additional data could be found from the service center maintenance digital library 300. Alternately, the data tags may contain additional information, such as latest version of software installed, date of last update or inspection, identification of name of last inspector or technician. This information can be written onto the data tag each time the LRU is serviced. Still other information can be made available via various other means. When the technician approaches the cockpit of an aircraft, the system 100 can detect the ID of all of the avionics devices present and communicate same via a WiFi, BlueTooth or cellular or other Internet connection, with a maintenance digital library 300, which may be embodied in many forms including, but not limited to, a processor 310, antenna 312, with a data drive 320 and a connection to a network and the internet 330.

Preferably, system 100 attaches to internet via various media (wifi, Bluetooth, cellular); 300 also attaches to internet; close physical proximity of 100 to 300 is not required, but could normally be 100's if not 1000's of miles. However, it is possible that 300 is proximate to 100 and 300 and communicates directly (without internet), then attaches to internet to gain remote assistance, if necessary.

The system 100 may receive GPS signals or otherwise determine the location of the technician and transmit such data to the data library 300, which could be a communication port to outside computers. The library system can provide a visual image of a particular part to be repaired along with fault isolation and repair instruction and project the same onto the head up display 162. The technician can use this immediately available information to diagnose the problems very quickly, leading to reduced aircraft down time. The entire repair process can be transmitted live to a remote location where a maintenance supervisor or inspector can assure compliance with established procedures. Remote experts can see what the technician is looking at in real time and can provide context-specific instructions, thereby improving the efficiency, accuracy and repeatability of maintenance operations.

It is believed that when these teachings are combined with the known prior art by a person skilled in the art, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. An aircraft maintenance system for aiding avionics technicians in repair to aviation equipment, the system comprising:
 a head-worn computing device comprising:
  a processor, for performing computing functions;
  a head up display, for display information to a person wearing said head-worn computing device;
  one of a voice activated controller or a touch pad, configured for receiving commands from the person; and
  a communication link, configured for enabling communication between the head-worn computing device and distant electronic equipment;
  wherein said computing functions comprise one of:
   receiving data from an RFID tag;
   using image recognition software to identify a piece of equipment to be serviced;
   using geo-location data to determine equipment in proximity to said head-worn computing device;
   a digital maintenance data library configured to communicate with said communication link and provide context-specific documentation of equipment to be serviced where an identity characteristic of said equipment to be serviced is determined electronically;
  wherein said computing functions comprise one of:
   receiving data from an RFID tag; and
   using global positioning system data to determine equipment proximity to said head-worn computing device;
   wherein said receiving data from an RFID tag comprises receiving data from an RFID which has been interrogated;
   wherein said head-worn computing device communicates with said digital maintenance library via an internet connection;

wherein said digital maintenance library is an avionics maintenance library and the person is an avionics technician;

wherein the context-specific documentation is maintenance information for avionics equipment which, being viewed by the person and said avionics equipment, has been identified by image recognition software;

wherein said processor receives both RFID data and image recognition software outputs;

wherein a duplicate image of an actual precise portion of an avionics LRU to be serviced is projected so as to be superimposed over the actual precise portion; and said head-worn computing device provides both visual and aural communication with the person and remote support personnel.

2. An aircraft maintenance system for aiding technicians in repair of aircraft equipment, the system comprising:

a head-worn computing device comprising:
a processor, for performing computing functions;
a head up display, to project information for a person wearing said head-worn computing device; and
one of a voice activated controller or a touch pad, configured for receiving commands from the person;
wherein said computing functions comprise:
receiving data from an RFID tag;
using image recognition software to identify an aircraft equipment to be serviced; and
using geo-location data to determine the aircraft equipment in proximity to said head-worn computing device; and a digital maintenance data library configured to communicate with said processor and provide context-specific documentation of the aircraft equipment to be serviced where an identity characteristic of the aircraft equipment to be serviced is determined electronically;

wherein the context-specific documentation is maintenance information for the aircraft equipment which, being viewed by the person, has been identified by the image recognition software, wherein a duplicate image of an actual precise portion of the aircraft equipment to be serviced is projected so as to be superimposed over the actual precise portion of the aircraft equipment.

3. The aircraft maintenance system of claim 2, wherein receiving data from an RFID tag comprises receiving data from an RFID tag which has been interrogated.

4. The aircraft maintenance system of claim 2, wherein said digital maintenance data library is configured to communicate with said processor via an internet connection.

5. The aircraft maintenance system of claim 2, wherein said digital maintenance data library is an avionics maintenance library.

6. The aircraft maintenance system of claim 2, wherein said head-worn computing device is configured to provide visual communication and aural communication with the person and remote support personnel.

7. The aircraft maintenance system of claim 2, wherein geo-location data includes global positioning system data.

8. The aircraft maintenance system of claim 2, wherein the aircraft equipment to be serviced is avionics equipment.

9. The aircraft maintenance system of claim 8, wherein said avionics equipment is a line replaceable unit.

10. An aircraft maintenance system for aiding avionics technicians in repair of avionics equipment, the system comprising:

a head-worn computing device comprising:
a processor, for performing computing functions;
a head up display, to project information for a person wearing said head-worn computing device; and
one of a voice activated controller or a touch pad, configured for receiving commands from the person;
wherein said computing functions comprise:
receiving data from an RFID tag;
using image recognition software to identify an avionics equipment to be serviced; and
using geo-location data to determine the avionics equipment in proximity to said head-worn computing device; and a digital maintenance data library configured to communicate with said processor and provide context-specific documentation of the avionics equipment to be serviced where an identity characteristic of the avionics equipment to be serviced is determined electronically;

wherein the context-specific documentation is maintenance information for the avionics equipment which, being viewed by the person, has been identified by the image recognition software, wherein a duplicate image of an actual precise portion of the avionics equipment to be serviced is projected so as to be superimposed over the actual precise portion of the avionics equipment.

11. The aircraft maintenance system of claim 10, wherein receiving data from an RFID tag comprises receiving data from an RFID tag which has been interrogated.

12. The aircraft maintenance system of claim 10, wherein said digital maintenance data library is configured to communicate with said processor via an internet connection.

13. The aircraft maintenance system of claim 10, wherein said digital maintenance data library is an avionics maintenance library.

14. The aircraft maintenance system of claim 10, wherein said head-worn computing device is configured to provide visual communication and aural communication with the person and remote support personnel.

15. The aircraft maintenance system of claim 10, wherein geo-location data includes global positioning system data.

16. The aircraft maintenance system of claim 10, wherein the avionics equipment is a line replaceable unit.

* * * * *